United States Patent Office 2,905,712
Patented Sept. 22, 1959

2,905,712

ACIDS AND KETONES PREPARED FROM PEROXIDES AND POLYHALOMETHANES

John B. Braunwarth, Crystal Lake, and Gifford W. Crosby, River Forest, Ill., assignors to The Pure Oil Company, Chicago, Ill., a corporation of Ohio No Drawing. Application December 24, 1956
Serial No. 630,090

22 Claims. (Cl. 260—539)

This invention relates to a method of preparing straight-chain aliphatic acids or ketones containing one or more halogen atoms in a terminal position, and more particularly, relates to the preparation of such compounds by the reaction of certain polyhalomethanes containing chlorine or chlorine and fluorine with alicyclic hydroperoxides in the presence of a ferrous salt. The compounds of this invention are useful intermediates in chemical synthesis in the field of straight-chain terminal difunctional compounds in the range of $C_4$ to $C_8$. These valuable intermediates may be converted, for example, to compounds useful in the fields of plasticizers, resins, and hydraulic fluids by known reactions of the polyhalide, carboxy and keto groups present in the compounds made by the process of this invention.

Many reactions of hydroperoxides are known in the prior art. E. G. E. Hawkins in his article entitled "Reactions of Organic Peroxides, Part II, Reactions of $\alpha\alpha$-Dimethylbenzyl Hydroperoxide ("Iso-Propylbenzene Hydroperoxide")" (J. Chem. Soc. 1950, 2169), shows the decomposition of $\alpha\alpha$-dimethylbenzyl hydroperoxide by ferrous sulfate under the influence of various catalysts and under thermal conditions to form mixtures of 2-phenylpropan-2-ol, acetophenone, and $\alpha$-methylstyrene. The hydroperoxides were first shown by Hock and Lang, Ber. 77, 257, (1944), to be formed by the oxidation of isopropylbenzene with air to give $Ph \cdot CMe_2OOH$. Improved methods for their preparation are described by Armstrong, Hall and Quin, British Patents 610,293 and 630,286; J. Chem. Soc. 1950, 666. E. G. E. Hawkins and P. P. Young (J. Chem. Soc. 1950, 2804), state that the reaction of methylcyclopentyl hydroperoxide with ferrous sulfate solution gives rise to the formation of dodecane-2,11-dione. However, the use of methylcyclohexyl hydroperoxide gives poorer yields of tetradecane-2,13-dione. N. Brown et al., J. Am. Chem. Soc. 77, 1756 (1955), describe the preparation of "cyclohexanone peroxide" by the autocatalyzed, liquid phase oxidation of cyclohexanol with oxygen. Reaction of these peroxides with the ferrous ion in hydrocarbon solution is said by Brown et al. to produce a 68% yield of 1,12-dodecanedioic acid.

M. S. Kharasch and W. Nudenberg in their article entitled, "Detection of Free Radicals in Solution, III, Formation of Long-Chain, $\alpha,\omega$-Dicarboxylic Acids" (J. Org. Chem. 19, 1921 (1954)), indicate that unsaturated dicarboxylic acids of 20 carbon atoms are formed from cyclohexanone peroxide and butadiene.

The formation of diketones and dibasic acids is assumed to take place by the rearrangement of an alkoxy radical to an open-chain carbon radical, followed by dimerization, thus:

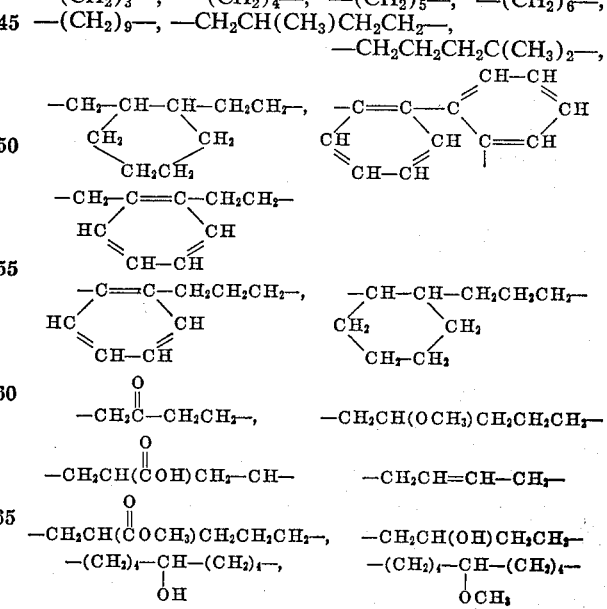

In the case of the $C_{20}$ dicarboxylic acids, the intermediate radical adds to the butadiene before dimerization.

It has been found in accordance with this invention that when compounds of a cyclic structure having a peroxide grouping attached directly to one of the carbon atoms in said cyclic structure are decomposed, as by the ferrous ion, in the presence of certain chloromethanes, the main products are not dicarboxylic acids or diketones but instead are omega-halogen-substituted products derived from only one peroxide molecule. Included are acids and ketones of one more carbon atom than is present in the original alicyclic compound, with terminal trichloro substitution. The reactions involved in the process of this invention are represented broadly as follows:

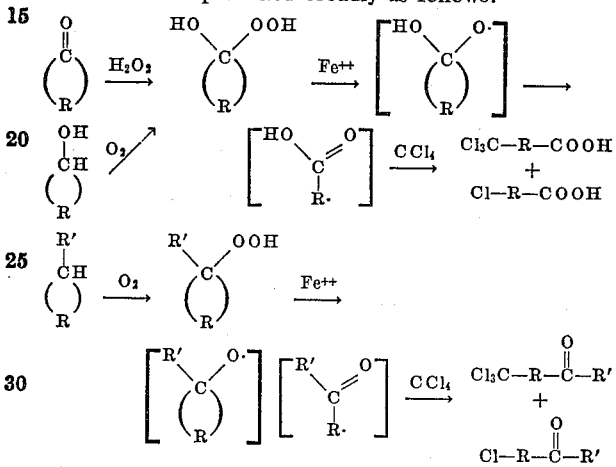

wherein R is a divalent polymethylene radical. R may also contain one or more substituent radicals from the group consisting of methyl, ethyl, propyl, butyl, benzyl, phenyl, cyclohexyl, chloro, fluoro, hydroxy, methoxy, carboxy, carbalkoxy and keto. The primary ring structure of the hydroperoxide may contain one or more non-aromatic double bonds. R' may be alkyl, cycloalkyl, aryl, alkylaryl or arylalkyl.

Examples of R groups contained in the primary ring structures in the above equations and formulas include, $-(CH_2)_3-$, $-(CH_2)_4-$, $-(CH_2)_5-$, $-(CH_2)_6-$, $-(CH_2)_9-$, $-CH_2CH(CH_3)CH_2CH_2-$, $-CH_2CH_2CH_2C(CH_3)_2-$, $-CH_2-CH-CH-CH_2CH_2-$,
  $\quad\ \ CH_2\ \ \ \ \ CH_2$
  $\quad\quad\ \ CH_2CH_2$ $-C=C-C$
          $\diagdown$
  $CH\quad\ \ CH\ \ \ C=CH$
  $\diagdown\quad\quad\diagup$
  $CH-CH$ $\begin{array}{c}CH-CH\\ \diagup\quad\ \diagdown\\ CH\\ \ \diagdown\quad\diagup\\ CH-CH\end{array}$ $-CH_2-C=C-CH_2CH_2-$
  $HC\diagdown\quad\diagup CH$
  $\quad CH-CH$ $-C=C-CH_2CH_2CH_2-$
  $HC\diagdown\quad\diagup CH$
  $\quad CH-CH$ $-CH-CH-CH_2CH_2CH_2-$
  $CH_2\quad\ \ CH_2$
  $\ \ CH_2-CH_2$ $-CH_2\overset{O}{\overset{\|}{C}}-CH_2CH_2-$, $-CH_2CH(OCH_3)CH_2CH_2CH_2-$ $-CH_2CH(\overset{O}{\overset{\|}{C}}OH)CH_2-CH-$ $-CH_2CH=CH-CH_2-$ $-CH_2CH(\overset{O}{\overset{\|}{C}}OCH_3)CH_2CH_2CH_2-$,  $-CH_2CH(OH)CH_2CH_2-$ $-(CH_2)_4-CH-(CH_2)_4-$
  $\quad\quad\quad\ \ OH$ $-(CH_2)_4-CH-(CH_2)_4-$
  $\quad\quad\quad\ \ OCH_3$ and similar structures. Preferred R groups are trimethylene, tetramethylene, pentamethylene and hexamethylene groups.

The term "peroxide compound" as used herein is broadly intended to cover compounds of the formulas set forth above and includes compounds which in the strict sense are defined as hydroperoxides. The preferred starting materials are the peroxides of the type obtainable by treating cycloalkanols or alkylcycloalkanes with oxygen, or cycloalkanones with hydrogen peroxide. Examples are the peroxide compounds obtained by reacting hydrogen peroxide with cyclopentanone and cyclohexanone (where R=—$(CH_2)_4$— and —$(CH_2)_5$, respectively), particularly the reaction products of hydrogen peroxide and cycloalkanones, and the oxidation products of cycloalkanols and alkylcycloalkanes. These products include cyclopentanone peroxide, cyclohexanone peroxide, cycloheptanone peroxide, methylcyclohexyl hydroperoxide, ethylcyclopentyl hydroperoxide, etc., following the above definitions for R and R'.

The polyhalomethanes used as reactants in this invention may be represented by the formula $$CH_nCl_mX_{4-n-m}$$

where X is chlorine or fluorine, $n$ is 0 or 1, $m$ is between 1 and $4-n$. These are polychloromethanes containing at least one chlorine atom and no bromine or iodine.

The reactions of this invention are more specifically illustrated by the following equations representing cyclohexanone peroxide and carbon tetrachloride in a reaction medium consisting of an aqueous methanol solution of ferrous sulfate.

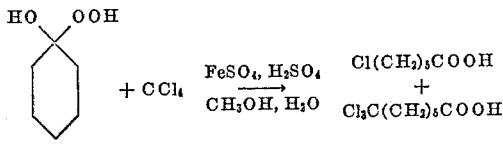

The products of the reaction are found in the organic phase in the form of the methyl esters due to the concentrations of methanol and sulfuric acid ordinarily employed.

The structure of methyl omega-chlorocaproate can be proven by treating it with potassium cyanide to form methyl omega-cyanocaproate and hydrolyzing the latter in alkaline medium as follows:

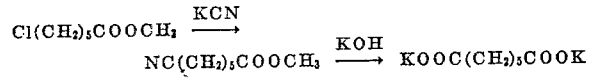

Acidification of the product of hydrolysis yields the free dibasic acid known and identified as pimelic acid,

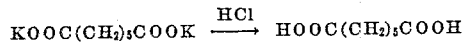

The structure of methyl 7,7,7-trichloroheptanoate can be proven by hydrolyzing it in acid medium, also forming pimelic acid,

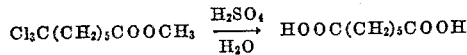

The use of reduction-oxidation conditions is essential to convert the peroxide compounds to the omega-halogen-substituted aliphatic acids. The term "redox" is used herein in its widely accepted sense to designate a reduction-oxidation system wherein an electron transfer takes place with the simultaneous formation of a free radical. In order for this transfer to take place, it is necessary that there be present a substance or substances which acts as a reducing agent for the peroxide compound. Those heavy metals which are capable of existing in several valence states such as iron, chromium, manganese, cobalt, copper and molybdenum are suitable reducing agents in their lower valence states. Certain organic and inorganic compounds may also be used such as sodium bisulfite, the reducing sugars, l-ascorbic acid, sodium formaldehyde sulfoxylate and other reducing agents used in the redox art.

The invention will be illustrated by the use of the ferrous ion, but is not to be limited thereby. In general, when using a heavy metal such as ferrous ion, the amount of ion is equivalent to, or in excess of, the amount of peroxide to be reacted. The heavy metal ions also may be used in trace amounts as promoters with any one of the aforementioned reducing agents which serve to convert the ferric ion to the ferrous ion as fast as the ferric ion is produced. Because of low cost, availability and efficiency, the ferrous ion is preferred for the reaction. Since this reaction does not involve dimerization, it is not necessary to exclude oxygen from the reaction system.

The reaction of this invention for the conversion of cyclic peroxide compounds to long-chain, omega-polyhalogen-substituted carboxylic acids can be carried out in various solvents such as water, ethanol, tertiary-butanol, aromatics, ethers, esters, ketones, dioxane, or other mixtures, or in the emulsion state. Pressures above or below atmospheric may be used. Pressures higher than atmospheric are advantageous where a relatively volatile solvent is used in the liquid phase. In general, the reaction proceeds at atmospheric pressure and at temperatures in the range of $-100°$ C. to $100°$ C. The preferred temperature range is $-30°$ C. to $60°$ C. The reaction is best carried out in a solvent common for the peroxide compound, the carbon tetrachloride and the reducing agent, since thereby rapid intermixture of reactants is possible and side reactions are minimized. When the ferrous ion is used as the reducing agent, methanol is the preferred common solvent. When water-soluble ferrous salts are used, the reaction may be carried out in an aqueous alcoholic medium in which contact between the two liquid phases is maintained by stirring. In conducting the reaction in the emulsion state using immiscible but selective solvents for the peroxide and carbon tetrachloride reactants, the use of a dispersing agent brings about better intermixing.

The reaction may be carried out in a batchwise or continuous manner. Some species of the peroxide reactants are highly explosive and sensitive to shock. Accordingly, precautions should be taken in handling these materials.

The omega-halogenated aliphatic acids of this invention may be separated from the reaction mixture by various means known in the art. They may be recovered by distillation in either the free acid or ester form; or, they may be converted to salts and purified by solvent extraction followed by regeneration of free acid with mineral acid, or by ion-exchange techniques. The ferric ion by-product of the reaction can be recovered by precipitation, ion-exchange, or by reduction and recycling to the process.

In order to illustrate the invention, the following example is given showing the preparation of ω-chlorocaproic acid and 7,7,7-trichloroheptanoic acid from "cyclohexanone peroxide."

Example I

Cyclohexanone peroxide (0.49 mole) in 750 cc. of methyl alcohol was cooled to 0° C., and 0.25 mole of carbon tetrachloride was added with stirring. Then a solution containing 147 gm. (0.53 mole) of ferrous sulfate heptahydrate, 25 cc. of sulfuric acid, and 250 cc. of distilled water was added dropwise to the reaction mixture over a period of 2 hours. After the ferrous salt addition was completed, the mixture was diluted with 2 liters of water and the organic phase was collected by extraction with benzene. The benzene solution was washed three times with 50 cc. portions of water, and then was dried over CaSO₄. This solution in benzene was filtered and distilled to remove benzene and unreacted cyclohexanone. (The "cyclohexanone peroxide" was prepared, prior to the carbon tetrachloride addition, in an excess of cyclohexanone.)

The chloro-acid products were then esterified by the addition of 200 cc. of methyl alcohol, with 8 gm. of p-toluene sulfonic acid as catalyst, and refluxed for 18 hrs. The mixture was diluted with 200 cc. of water and the organic phase was again collected in benzene and worked up by water-washing and CaSO₄-drying. The benzene solution was then filtered and distilled to remove the benzene.

Using a 12-inch Vigreaux column, 13.8 gm. of methyl omega-chlorocaproate was collected at 103° C. at 12 mm. pressure. Yield based on carbon tetrachloride—34 mole percent.

*Analysis.*—Theoretical for $C_7H_{13}ClO_2$: carbon, 51.2%; hydrogen, 7.9%; chlorine, 21.5%; molecular wt., 164.5. Found: carbon, 51.5%; hydrogen, 8.2%; chlorine, 22.2%; molecular wt., 163.

The structure of the product was confirmed by conversion to a dibasic acid by replacement of the chlorine with the cyano group and subsequent hydrolysis. The melting point, and the mixed melting point with a known sample of pimelic acid, showed this product to be identical with pimelic acid, and therefore that the chloro-ester was methyl omega-chlorocaproate.

The distillation in the 12-inch Vigreaux column was continued and 6.9 gm. of crude methyl 7,7,7-trichloroheptanoate was collected at 85 to 90° C. at 1.4 mm. pressure. The yield based on carbon tetrachloride was 11 mole percent.

*Analysis.*—Theoretical for $C_8H_{13}Cl_3O_2$: carbon, 38.8%; hydrogen, 5.3%; chlorine, 43.0%; molecular wt., 247.5. Found: carbon, 42.6%; hydrogen, 5.8%; chlorine, 38.8%; molecular wt., 230.

The structure of this product was confirmed by its conversion to a dibasic acid by hydrolysis in the presence of sulfuric acid. The melting point, and the mixed melting point with a known sample of pimelic acid, showed the product to be identical with pimelic acid, and therefore that the polychloroester was methyl 7,7,7-trichloroheptanoate.

Example II

The reaction between cyclohexanone peroxide (0.5 mole) and chloroform (0.5 mole) was carried out in the same manner as Example I. Vacuum distillation of the reaction product gave 3.8 gm. of methyl ω-chlorocaproate and 3.9 gm. of crude methyl 7,7,7-trichloroheptanoate, identified by hydrolysis to pimelic acid.

Additional examples of compounds obtainable by the process of this invention are ω-chlorovaleric acid, 5-chloropentyl methyl ketone, 4-chlorobutyl ethyl ketone, 7,7,7-trifluoroheptanoic acid, 6,6,6-trichlorohexyl methyl ketone.

What is claimed is:

1. The process which comprises converting a compound of the general formula (I)

into compounds of the general formulas (II)

and (III)

wherein in said formulas, Y is a substituent selected from the group of hydroxyl and alkyl groups of 1 to 6 carbon atoms, R is a divalent alkylene radical having its essential part a chain of from 3 to 9 carbon atoms in the unsubstituted portion thereof and X is a halogen selected from the group of chlorine and fluorine by reaction of compounds of Formula I with a reactant selected from compounds of the formula $CH_nCl_mX_{4-n-m}$ wherein X is a halogen selected from the group of chlorine and fluorine, n is an integer of zero to 1, and m is an integer having a value of 1 to 4−n, in the presence of a redox reducing agent and separating compounds of Formulas II and III from the resulting reaction mixture.

2. The process in accordance with claim 1 in which the reactant is carbon tetrachloride.

3. The process in accordance with claim 1 in which the reactant is chloroform.

4. The method in accordance with claim 2 in which the heavy metal ion is selected from the group consisting of the ferrous ion, chromous ion, manganous ion, cobaltous ion, and the cuprous ion, same being obtained from salts thereof.

5. The method in accordance with claim 4 in which the heavy metal ion is the ferrous ion.

6. The method in accordance with claim 4 in which the heavy metal ion is chromous ion.

7. The method in accordance with claim 4 in which the heavy metal ion is manganous ion.

8. The method in accordance with claim 4 in which the heavy metal ion is cobaltous ion.

9. The method in accordance with claim 4 in which the heavy metal ion is the cuprous ion.

10. The method in accordance with claim 1 in which Y is the hydroxyl group.

11. The method in accordance with claim 1 in which Y is an alkyl group containing from 1 to 6 carbon atoms.

12. The method in accordance with claim 1 in which R in Formula I is a trimethylene group.

13. The method in accordance with claim 1 in which R in Formula I is a tetramethylene group.

14. The method in accordance with claim 1 in which R in Formula I is a pentamethylene group.

15. The method in accordance with claim 1 in which R in Formula I is a hexamethylene group.

16. The method in accordance with claim 1 in which the compounds of Formula I are selected from the group of cyclohexanol hydroperoxides and alkylcycloalkane hydroperoxides.

17. The method in accordance with claim 16 in which the compounds of Formula I are cyclohexanol hydroperoxides and the end product of the reaction is an omega-chloro-substituted aliphatic acid containing one chlorine atom and the same number of carbon atoms as the compounds of Formula I.

18. The method in accordance with claim 16 in which the compounds of Formula I are cyclohexanol hydroperoxides and the end product of the reaction is an omega-trichloro-susbtituted aliphatic acid containing one more carbon atom than the compound of Formula I.

19. The method in accordance with claim 16 in which the compounds of Formula I are alkylcycloalkane hydroperoxides and the end product of the reaction is an omega-chloro-substituted aliphatic ketone containing one chlorine atom and the same number of carbon atoms as the compound of Formula I.

20. The method in accordance with claim 16 in which the compounds of Formula I are alkylcycloalkane hydroperoxides and the end product of the reaction is an omega-trichloro-substituted aliphatic ketone containing one more carbon atom than the compound of Formula I.

21. The method in accordance with claim 1 in which the compound of Formula I is cyclohexanone peroxide, the reactant is carbon tetrachloride and the end product is 7,7,7-trichloroheptanoic acid.

22. The process in accordance with claim 1 in which said reaction is conducted in the presence of a redox reducing agent comprising a heavy metal ion capable of existing in several valence states and by the use of temperatures ranging from about −100° C. to 60° C. in the presence of a mutual solvent.

References Cited in the file of this patent

UNITED STATES PATENTS

| | | |
|---|---|---|
| 2,710,302 | Hyson | June 7, 1955 |
| 2,811,551 | Coffman et al. | Oct. 29, 1957 |

UNITED STATES PATENT OFFICE
CERTIFICATE OF CORRECTION

Patent No. 2,905,712                         September 22, 1959

John B. Braunwarth et al.

It is hereby certified that error appears in the printed specification of the above numbered patent requiring correction and that the said Letters Patent should read as corrected below.

Column 6, line 7, for the claim reference numeral "2" read -- 22 --.

Signed and sealed this 31st day of May 1960.

(SEAL)

Attest:

KARL H. AXLINE
Attesting Officer

ROBERT C. WATSON
Commissioner of Patents